Feb. 13, 1951 J. A. CURTIS 2,541,042

PORTABLE TRANSMITTER-RECEIVER APPARATUS

Filed Feb. 19, 1947

INVENTOR
JOHN A. CURTIS

BY [signature]

ATTORNEY

Patented Feb. 13, 1951 2,541,042

UNITED STATES PATENT OFFICE 2,541,042

PORTABLE TRANSMITTER-RECEIVER APPARATUS

John A. Curtis, Fort Wayne, Ind., assignor, by mesne assignments, to Farnsworth Research Corporation, a corporation of Indiana Application February 19, 1947, Serial No. 729,601

2 Claims. (Cl. 250—13)

This invention relates to radio communication apparatus, and more particularly relates to a portable transmitter and receiver with associated transducers supported by a harness which may be worn by an operator.

It is conventional practice to provide for military, railroad and police communication purposes a portable radio transmitter and receiver with associated microphone and headphones. In operation the headphones constantly cover the operator's ears so that his ability to hear external sounds such as conversation or audible signals is greatly restricted. Furthermore, the operator constantly uses one hand for holding the microphone in a predetermined position in front of his mouth while the use of his other hand is required at least part of the time for actuating a switch or switches in order to enable him either to transmit or to receive signals. Thus, the efficiency of the operator carrying the communication equipment is greatly reduced because he is unable to hear external sounds and does not have the full use of his hands. In order to simplify manipulation of the switches which condition the apparatus for alternately receiving or transmitting signals, it is conventional practice to provide a microphone which bears a "push-to-talk" switch which will energize the transmitter when depressed, while the receiver is normally in operative condition. However, even with this improved portable communication equipment, the operator still uses one hand for holding the microphone and actuating its switch and he is still unable to hear external sounds in view of the fact that he must wear earphones to receive intelligence.

It would obviously be very desirable to provide portable communication apparatus which will enable the operator to retain the use of his hands even while operating his equipment and which will enable him to hear signals other than those reproduced by the receiver, thus to increase his efficiency.

It is an object of the present invention, therefore, to provide portable transmitter and receiver apparatus including a microphone and a loud-speaker which may be carried by an operator by means of a harness in such a manner as to prevent interference with the operator's ability to hear external sounds or with his normal activities and to permit substantially full use of his hands at all times.

Another object of the invention is to provide, in portable communication apparatus including a transmitter and receiver, a control switch for permitting selective reception or transmission of speech or signals and arranged to be actuated in such a manner that the operator retains at all times substantially the full use of both his hands.

A further object of the invention is to provide portable communication equipment of the type referred to including a loud-speaker adjustably and yieldably arranged in close proximity to an ear of the operator and a microphone adjustably provided closely adjacent the operator's mouth without interfering with the operator's hearing or his normal movements.

In accordance with the present invention there is provided portable communication apparatus comprising a normally operative receiver for receiving signals, a first device coupled to the receiver for reproducing the received signals, a second device for picking up sound and a normally inoperative transmitter coupled to the second device for amplifying and transmitting the sound. The receiver, the first and second device and the transmitter are supported by a harness adapted to be worn by an operator. Finally, switching means are provided for rendering the receiver inoperative and for simultaneously rendering the transmitter operative. The switching means is supported by the harness and adapted to be arranged under the arm of the operator and to be actuated thereby. Thus, the operator retains substantially the full use of his hands because he can actuate the control switch by a pressure of his arm.

For a better understanding of the invention, together with other and further objects thereof, reference is made to the following description, taken in connection with the accompanying drawing, and its scope will be pointed out in the appended claims.

Figure 1:
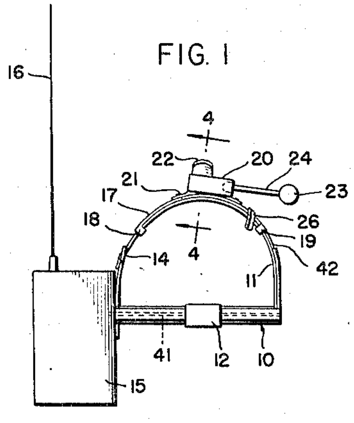
Fig. 1 is a side view of a portable communication apparatus and its control switch supported by an adjustable harness in accordance with the invention.
Figure 2:
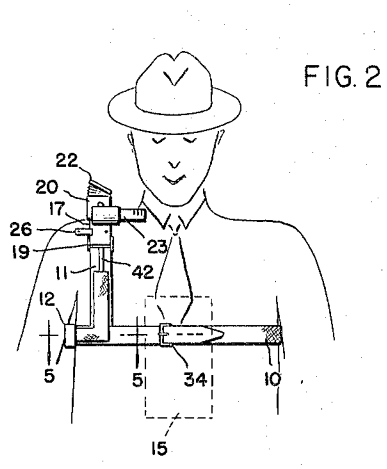
Fig. 2 is a front view of the portable communication apparatus of Fig. 1 strapped to an operator by means of the adjustable harness which includes a belt and a shoulder strap.

Referring now to Figs. 1 and 2, there is illustrated a portable communication apparatus embodying the present invention and comprising housing 15 from which projects antenna 16. Housing 15 contains suitable radio transmitting and receiving apparatus not illustrated. Antenna 16 is adapted to be alternatively coupled to either the receiver or transmitter in housing 15 for intercepting or radiating modulated carrier waves. The receiver is normally in operative condition while the transmitter is normally inoperative. A master switch, not illustrated, may be provided for disconnecting the power from both transmitter and receiver. For the purpose of conditioning the equipment to transmit signals, there may be provided switch box 12 for simultaneously de-energizing the receiver and energizing the transmitter. The portable communication equipment further includes microphone 23 and loud-speaker 22 which are coupled to the transmitter and receiver, respectively, and mounted on transducer chassis 20.

For the purpose of carrying the communication equipment including receiver and transmitter housing 15 and transducer chassis 20, there is provided a harness including belt 10 which may be worn about the chest of the operator as illustrated in Fig. 2. Belt 10 may be adjusted by a buckle 34. The harness further includes a shoulder strap 11, one end of which is fixed to the front portion of belt 10, while the other end of strap 11 is adjustably secured to the rear portion of belt 10 by buckle mount 14. Receiver and transmitter housing 15 is fastened to the rear portion of belt 10 adjacent to buckle mount 14.

Belt 10 and strap 11 may be made of any suitable water resistant material such as canvas, leather or the like. It is to be understood that another shoulder strap may be attached to belt 10 and disposed about the operator's other shoulder to provide, if required, additional support for receiver and transmitter housing 15.

Transducer chassis 20 is slidably arranged upon the upper section of shoulder strap 11. To this end there is provided shoulder mount 17 which may consist of the same or similar material as does strap 11 and which is adjustably arranged thereon by loops 18 and 19.

Figure 3:
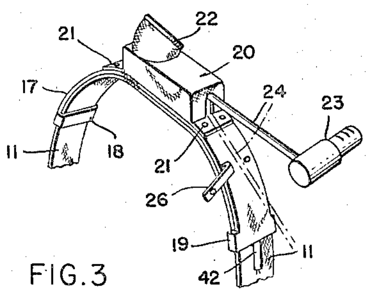
Fig. 3 is a view in perspective of the shoulder strap having mounted thereon a sound reproducer and a microphone.

As illustrated particularly in Fig. 3, transducer chassis 20 is secured to shoulder mount 17 by rivets 21 and supports loud-speaker unit 22 and microphone 23. The microphone is connected to transducer chassis 20 by microphone arm 24 which may be of flexible construction and which may be arranged to be swiveled in a vertical plane. When the micrpohone is not in use, it may be secured by strap 26 to shoulder mount 17 away from the operator's head, the inoperative position being illustrated in dotted line in Fig. 3.

Figure 4:
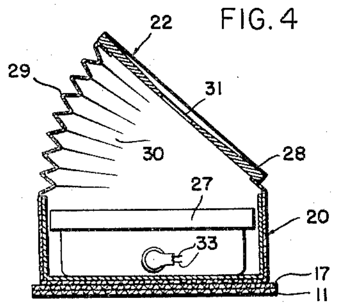
Fig. 4 is a sectional view taken on line 4—4 of Fig. 1 on an enlarged scale of the yieldable sound reproducer unit including a sound chamber.

Loud-speaker unit 22 is yieldably supported upon transducer chassis 20 as shown particularly in Fig. 4. Loud-speaker unit 22 comprises reproducer 27 suitably disposed within chassis 20. A protective cap 28 has one side thereof fixed to the upper surface of chassis 20 and a flexible wall 29 arranged about the perimeter of cap 28 is secured to chassis 20. Thus, a sound chamber 30 is provided by cap 28, flexible wall 29 and reproducer 27 which may be appropriately directed toward the operator's ear. Aperture 31 is provided in cap 28 in order to permit passage of the reproduced sound waves from sound chamber 30. Conductors 33 connected to reproducer 27 may be contained within suitable interconnecting cables which preferably are embodied within the interior of the supporting harness, that is, of shoulder strap 11.

Loud-speaker unit 22 and microphone 23 are placed upon the operator's shoulder as shown in Fig. 2 in a position adjacent his ear and mouth so that his hearing is not restricted. The construction of loud-speaker unit 22 permits the operator to adjust the angular setting of the unit for optimum recetpion and prevents injury of the operator in case his head should accidentally hit the unit. Microphone 23 in its operating position such as illustrated in Figs. 2 and 3 does not interfere with the operator's speech or vision. If the microphone is not used, it may be secured by fastener 26 against the chest of the operator.

Figure 5:
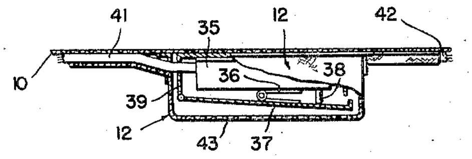
Fig. 5 is a sectional view taken on line 5—5 of Fig. 2 on enlarged scale of the control switch mounted on the harness belt.

Switch box 12 shown in greater detail in Fig. 5 is preferably arranged upon belt 10 under the operator's upper arm and may be actuated by inward pressure of the upper arm. Switch box 12 comprises a flexible outer case 43 of a substance such as canvas similar to that of belt 10 to which it is affixed. Within case 43 there is disposed switch element 35 and spring 36 which normally urges pressure lever 37 outwardly. Thus, switch pin 38 normally extends outwardly from switch element 35 as illustrated. Pressure lever 37 has one end thereof pivotally mounted to support 39. A pressure exerted by the operator's upper arm against flexible outer wall 43 will depress pressure lever 37 against the action of spring 36 to displace switch pin 38. Thus, switch element 35 is closed to render the normally inoperative transmitter operative while simultaneously rendering the normally operative receiver inoperative. This switch thus operates as a "push-to-talk" switch conventionally provided on the microphone where it must be actuated by the operator's hand. Switch element 35 is connected to the transmitter and receiver in housing 15 by suitable conductors such as cables 41 and 42. Connecting cable 41 is shown disposed within the interior of belt 10, while connecting cable 42 is contained within a portion of shoulder strap 11.

The communication apparatus of the present invention is normally adapted to provide signal reception. When the operator wishes to transmit signals, he actuates switch element 35 by a pressure of his upper arm. Upon releasing the pressure on switch 12, the equipment is again conditioned for reception. Thus, the operator retains at all times substantially the full use of his forearms, and his hand and his hearing is not restricted. The operator accordingly may pursue such activities as riding, hand signalling in freight yards, writing, climbing ladders, driving or walking while maintaining communication with a remotely located station.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a portable communication apparatus comprising a normally inoperative radio transmitter and a normally operative receiver, a reproducer coupled to said receiver and a microphone coupled to said transmitter, a switch operative to render said receiver inoperative and said transmitter operative when it is desired to transmit therefrom, and a harness comprising a belt and a shoulder strap for supporting said apparatus: an arrangement for enabling operation of said apparatus with a maximum freedom of the arms and minimum interference with normal hearing comprising the belt of said harness being positioned to pass about the body of the operator under the upper arms, means for mounting said switch on said belt for support under one arm of the operator when the belt is in place, means for mounting said reproducer and said microphone on said shoulder strap of said harness, said reproducer being directed toward the ear, and said microphone extending from said supporting means toward the mouth of said operator.

2. A portable communication apparatus according to claim 1, wherein said means for mounting said reproducer comprises a means for mounting the reproducer substantially horizontally on said shoulder strap comprising sound directing bellows surrounding said reproducer unit, said bellows being arranged at the outer periphery of said means and extending arculately upward toward the operator's ear, and an end member for said bellows provided with a central aperture arranged at an angle directed toward the ear of said operator.

JOHN A. CURTIS.

REFERENCES CITED

The following references are of record in the file of this patent:

UNITED STATES PATENTS

| Number | Name | Date |
|---|---|---|
| 1,211,976 | Spencer et al. | Jan. 9, 1917 |
| 2,285,083 | Cover | June 2, 1942 |
| 2,348,138 | Latus et al. | May 2, 1944 |

OTHER REFERENCES

Wireless World, Nov. 29, 1935, article entitled "Current Topics."

Popular Science Monthly, Aug. 1938, article entitled "Knapsack."